(12) United States Patent
Lim et al.

(10) Patent No.: US 10,562,287 B2
(45) Date of Patent: Feb. 18, 2020

(54) WINDOW FILM AND METHOD OF PREPARING THE SAME

(71) Applicant: DONGWOO FINE-CHEM CO., LTD., Jeollabuk-do (KR)

(72) Inventors: Jong Kwan Lim, Gyeonggi-do (KR); Han Bae Lee, Gyeonggi-do (KR); Jae Hun Cha, Gyeonggi-do (KR); Seung Baek Hong, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 15/768,080

(22) PCT Filed: Oct. 5, 2016

(86) PCT No.: PCT/KR2016/011125
§ 371 (c)(1),
(2) Date: Apr. 13, 2018

(87) PCT Pub. No.: WO2017/065446
PCT Pub. Date: Apr. 20, 2017

(65) Prior Publication Data
US 2018/0297349 A1    Oct. 18, 2018

(30) Foreign Application Priority Data
Oct. 13, 2015   (KR) .................. 10-2015-0142892

(51) Int. Cl.
*B32B 37/24* (2006.01)
*G06F 3/041* (2006.01)
(Continued)

(52) U.S. Cl.
CPC ............... *B32B 37/24* (2013.01); *B32B 7/12* (2013.01); *G06F 3/041* (2013.01); *G06F 3/044* (2013.01); *B32B 37/12* (2013.01); *B32B 38/0012* (2013.01); *B32B 2037/243* (2013.01); *B32B 2255/10* (2013.01); *B32B 2255/26* (2013.01); *B32B 2255/28* (2013.01); *B32B 2305/72* (2013.01); *B32B 2307/42* (2013.01); *B32B 2310/0806* (2013.01); *B32B 2457/208* (2013.01); *G06F 2203/04102* (2013.01); *G06F 2203/04103* (2013.01)

(58) Field of Classification Search
CPC ...................................................... B32B 37/24
USPC ...................................................... 428/157
See application file for complete search history.

(56) References Cited

U.S. PATENT DOCUMENTS

2014/0049699 A1* 2/2014 Huang ................ G02B 5/3016
349/12

FOREIGN PATENT DOCUMENTS

KR   10-2011-0002857 A    1/2011
KR   10-2013-0056598 A    5/2013
(Continued)

OTHER PUBLICATIONS

International Search Report for PCT/KR2016/011125.

*Primary Examiner* — Brent T O'Hern
(74) *Attorney, Agent, or Firm* — The PL Law Group, PLLC (57) ABSTRACT

A shielding pattern embedded type window film includes a base film, a first hard coating layer and a second hard coating layer which are sequentially laminated on one surface of the base film, and a shielding pattern disposed at an outer area between the first hard coating layer and the second hard coating layer.

10 Claims, 2 Drawing Sheets

(51) Int. Cl.
*B32B 7/12* (2006.01)
*G06F 3/044* (2006.01)
*B32B 37/12* (2006.01)
*B32B 38/00* (2006.01)

(56) References Cited

FOREIGN PATENT DOCUMENTS

| | | |
|---|---|---|
| KR | 10-2013-0142715 A | 12/2013 |
| KR | 10-2014-0057836 A | 5/2014 |
| KR | 10-2015-0087494 A | 7/2015 |
| TW | 201505038 A | 2/2015 |

* cited by examiner

WINDOW FILM AND METHOD OF PREPARING THE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/011125, filed Oct. 5, 2016, which claims priority to the benefit of Korean Patent Application No. 10-2015-0142892 filed in the Korean Intellectual Property Office on Oct. 13, 2015, the entire contents of which are incorporated herein by reference.

BACKGROUND

1. Technical Field

Embodiments of the present invention relate to a window film and a method of preparing the same, and more particularly, to a window film substantially devoid of a stepped portion and a method of preparing the same.

2. Description of the Related Art

Recently, various display devices capable of displaying information have been developed. The display devices may include a liquid crystal display device, organic electroluminescence display device, plasma display panel, field emission display device, or the like.

Also, a flexible display which is more thin and lighter than a conventional panel and is bendable and foldable by using a polymer film instead of a glass substrate have been researched. In this regard, touch sensor patterns were formed on the conventional glass substrate, however, the glass substrate is replaced by a film material for realizing flexible properties. In the flexible display, as an entire thickness of the display panel becomes greater, the display panel may be damaged while being bent due to an increased impact or stress. Therefore, reducing a thickness of each component may be required for achieving the flexible display.

In addition, a touch screen panel in which the display device is coupled with a touch sensor has been rapidly developed in, e.g., a smart phone.

Figure 1:
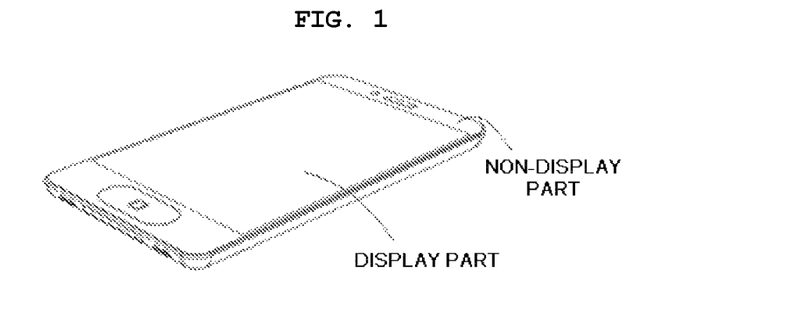
FIG. 1 is a schematic perspective view of a conventional mobile phone.

For example, referring to a smart phone as illustrated in FIG. 1, a cover window substrate is disposed at an outermost surface, and the cover window substrate is divided into a display part which displays an image on a front surface thereof, and receives a touch input as necessary, and a non-display part surrounding the display part.

The non-display part includes a non-display part shielding pattern configured to shield opaque conductive wiring patterns and various circuits, and a trade mark, or logo, etc. of a mobile phone maker can be printed thereon as necessary. A primary purpose of the conventional non-display part was to shield the wirings or circuits, such that the non-display part was typically formed in a simple color layer. Korean Patent Laid-Open Publication No. 2013-56598 discloses a technology for forming a bezel pattern using a thermosetting black ink composition.

However, as disclosed in Korean Patent Laid-Open Publication No. 2013-56598, since the shielding pattern is formed on the window substrate, a stepped portion is caused due to the protruding shielding pattern when laminating an optical film and a touch sensor thereon in a subsequent process.

SUMMARY

Example embodiments of the present invention provide a window film including a shielding pattern which does not protrude.

Example embodiments of the present invention provide a thinner window film.

The above objects of the present invention will be achieved by the following characteristics:

(1) A shielding pattern embedded type window film, comprising: a base film; a first hard coating layer and a second hard coating layer which are sequentially laminated on one surface of the base film; and a shielding pattern disposed at an outer area between the first hard coating layer and the second hard coating layer.

(2) The shielding pattern embedded type window film according to above (1), further comprising an adhesive layer or a bonding layer formed between the base film and the first hard coating layer.

(3) The shielding pattern embedded type window film according to above (1), wherein the first hard coating layer includes a stepped portion at the outer area, and the shielding pattern is formed in the stepped portion while not protruding from a flat surface of the first hard coating layer in which the stepped portion is not formed.

(4) The shielding pattern embedded type window film according to above (1), wherein the shielding pattern has different roughnesses (Ra) between a surface contacting the first hard coating layer and a surface contacting the second hard coating layer.

(5) The shielding pattern embedded type window film according to above (4), wherein the surface of the shielding pattern contacting the first hard coating layer has a larger roughness than that of the surface contacting the second hard coating layer.

(6) The shielding pattern embedded type window film according to above (5), wherein a difference in the roughness between the surface of the shielding pattern contacting the first hard coating layer and the surface contacting the second hard coating layer is in a range of 0.01 to 100 µm.

(7) The shielding pattern embedded type window film according to above (1), wherein the second hard coating layer contacts the first hard coating layer and the shielding pattern in a single surface.

(8) The shielding pattern embedded type window film according to above (1), wherein the second hard coating layer is disposed toward a visible side of the window film.

(9) The shielding pattern embedded type window film according to above (1), further comprising a polarizer laminated on a side of the first hard coating layer.

(10) The shielding pattern embedded type window film according to above (9), wherein the polarizer has a protective film adhered on at least one surface thereof.

(11) The shielding pattern embedded type window film according to above (1), further comprising a touch sensor laminated on a side of the first hard coating layer.

(12) The shielding pattern embedded type window film according to above (1), further comprising a polarizer and a touch sensor laminated on a side of the first hard coating layer.

(13) A method of fabricating a shielding pattern embedded type window film, comprising: forming a second hard coating layer on a carrier substrate; forming a shielding pattern at an outer area of the second hard coating layer; forming a first hard coating layer which covers the shielding pattern and the second hard coating layer; adhering a base film to the first hard coating layer; and peeling off the carrier substrate.

(14) The method of fabricating a shielding pattern embedded type window film according to above (13), further comprising generating a roughness on a surface of the shielding pattern.

(15) An image display device comprising the shielding pattern embedded type window film according to any one of above (1) to (12).

According to embodiments of the present invention, the shielding pattern is embedded in the window film so that the window film has a substantially leveled or flat surface. Accordingly, other members may be laminated on the window substantially without causing a stepped portion.

In addition, the shielding pattern may be formed without considering interference with other optical films. The shielding pattern is located ahead of the polarizer when viewing from a viewing side, so that various and vivid colors may be realized in the shielding pattern.

Further, according to embodiments of the present invention, a difference of a roughness between the viewing side of the shielding pattern and an opposite side thereof may be provided, so that visibility of the shielding pattern and adhesiveness with the hard coating layer may be improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The present invention discloses a shielding pattern embedded type window film which includes: a base film; a first hard coating layer and a second hard coating layer which are sequentially laminated on one surface of the base film; and a shielding pattern which is disposed at an outer area between the first hard coating layer and the second hard coating layer, such that laminating other members and implementation of the shielding pattern may be easily achieved without a stepper portion due to the shielding pattern.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

Figure 2:
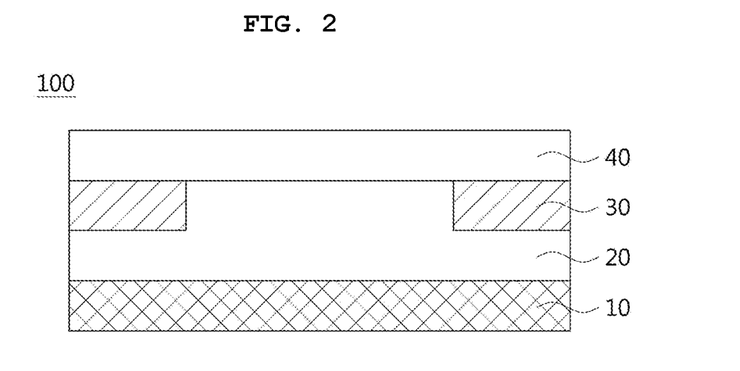
FIG. 2 is a schematic cross-sectional view illustrating a window film according to an embodiment of the present invention.

FIG. 2 is a schematic cross-sectional view illustrating a window film 100 according to an embodiment of the present invention.

The window film 100 of embodiments of the present invention includes a base film 10, a first hard coating layer 20, a shielding pattern 30 and a second hard coating layer 40.

<Base Film>

A material of the base film 10 is not particularly limited so long as it may be applied to an image display device, a touch screen panel, or the like, and may have high durability so as to sufficiently protect structures formed thereon and allow a user to see an image displayed on a screen, and a base substrate used in the related art may be used without particular limitation thereof. For example, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP) or the like may be used. These materials may be used alone or in a combination thereof.

A thickness of the base film 10 is not particularly limited, and may be in a range of, e.g., about 10 to 200 μm.

The base film 10 may be adhered to the first hard coating layer 20 by using a known adhesive means. For example, an adhesive layer or a bonding layer (not illustrated) may be used, but it is not limited thereto.

<First Hard Coating Layer>

The first hard coating layer 20 may provide desired strength and hardness with the window film 100, and may provide a stepped portion in which the shielding pattern 30 is formed.

As illustrated in FIG. 2, the first hard coating layer 20 may include the stepped portion (or a recess) at an outer area defined as the non-display part in an image display device to which the window film 100 may be applied. The stepped portion may be defined between the first hard coating layer 20 and the second hard coating layer 40. The shielding pattern 30 may be formed in the stepped portion.

The first hard coating layer 20 may be formed of a composition for forming a hard coating layer known in the related art, and may include, for example, a photo-polymerizable compound, a photo-polymerization initiator, and an additive.

Photo-Polymerizable Compound

The photo-polymerizable compound used for forming the hard coating layer of the present invention may include a photo-polymerizable functional group, and may be a photo-polymerizable monomer, photo-polymerizable oligomer, or the like, and may be a photo-radical polymerizable compound, for example.

The photo-polymerizable monomer may include, for example, a monomer including an unsaturated group in a molecule such as a (meth)acryloyl, vinyl, styryl or allyl group as a photo-curable functional group generally used in the related art without particular limitation thereof, and more particularly, may include mono-functional and/or poly-functional (meth)acrylates. These compounds may be used alone or in a combination thereof.

In the present disclosure, "(meth)acryl-" refers to "methacryl-", "acryl-" or both of them.

Examples of the (meth)acrylate monomer may include, as (meth)acrylic acid ester, trimethylolpropane tri(meth)acrylate, pentaerythritol tri(meth)acrylate, glycerol tri(meth)acrylate, tris(2-hydroxyethyl)isocyanurate tri(meth)acrylate, ethyleneglycol di(meth)acrylate, propyleneglycol (meth)acrylate, 1,3-butanediol di(meth)acrylate, 1,4-butanediol di(meth)acrylate, 1,6-hexanediol di(meth)acrylate, neopentylglycol di(meth)acrylate, diethyleneglycol di(meth)acrylate, triethyleneglycol di(meth)acrylate, dipropyleneglycol di(meth)acrylate, bis(2-hydroxyethyl)isocyanurate di(meth)acrylate, poly(meth)acrylate having ethylene oxide or propylene oxide added to the (meth) acrylic acid ester, etc.; oligo ester (meth)acrylate having 1 to 3 (meth)acryloyl groups in a molecule, oligo ether (meth)acrylic acid ester, oligo urethane (meth)acrylic acid and oligo epoxy (meth)acrylic acid, etc.; hydroxyethyl (meth)acrylate, hydroxypropyl (meth)acrylate, hydroxybutyl (meth)acrylate and products having ethylene oxide or propylene oxide added to the (meth) acrylic acid ester, etc.; mono(meth)acrylic acid ester, for example, a monomer having (meth)acryloyl groups of tri-functional or less such as isooctyl(meth)acrylate, isodecyl(meth)acrylate, stearyl(meth)acrylate, tetrahydrofurfuryl (meth)acrylate, phenoxyethyl(meth)acrylate, etc.; and dipentaerythritol hexa(meth)acrylate, dipentaerythritol hydroxy penta(meth)acrylate, pentaerythritol tetra(meth)acrylate, ditrimethylolpropane tetra(meth)acrylate, or the like. These compounds may be used alone or in a combination thereof.

The photo-polymerizable oligomer may include, for example, at least one selected from a group consisting of epoxy(meth)acrylate, urethane (meth)acrylate and polyester (meth)acrylate, and in particular, may be prepared by mixing urethane (meth)acrylate and polyester (meth)acrylate, or by mixing two types of polyester (meth)acrylate. Preferably, from an aspect of improving scratch resistance, hardness of a cured material and an elastic modulus of the hard coating layer, urethane (meth)acrylate oligomer may be used.

The urethane (meth)acrylate may be prepared by reacting poly-functional (meth)acrylate having a hydroxyl group in a molecule with a compound having an isocyanate group in the presence of a catalyst according to a method known in the related art.

Examples of the poly-functional(meth)acrylate having a hydroxyl group in a molecule may include at least one selected from a group consisting of 2-hydroxyethyl (meth)acrylate, 2-hydroxyisopropyl (meth)acrylate, 4-hydroxybutyl (meth)acrylate, caprolactone ring-opened hydroxyacrylate, a pentaerythritol tri/tetra(meth)acrylate mixture, and a dipentaerythritol penta/hexa(meth)acrylate mixture.

Examples of the compound having an isocyanate group may include at least one selected from a group consisting of 1,4-diisocyanatobutane, 1,6-diisocyanatohexane, 1,8-diisocyanantooctane, 1,12-diisocyanatododecane, 1,5-diisocyanato-2-methylpentane, trimethyl-1,6-diisocyanatohexane, 1,3-bis(isocyanatomethyl)cyclohexane, trans-1,4-cyclohexenediisocyanate, 4,4'-methylenebis(cyclohexylisocyanate), isophorone diisocyanate, toluene-2,4-diisocyanate, toluene-2,6-diisocyanate, xylene-1,4-diisocyanate, tetramethyl xylene-1,3-diisocyanate, 1-chloromethyl-2,4-diisocyanate, 4,4'-methylenebis(2,6-dimethylphenylisocyanate), 4,4'-oxybis(phenylisocyanate), tri-functional isocyanate derived from hexamethylenediisocynate, and trimethanepropanol adduct tolenediisocyanate.

Examples of the urethane (meth)acrylate oligomer may include products obtained by a reaction of 2-hydroxyethyl (meth)acrylate with 2,4-tolylene diisocyanate, reaction of 2-hydroxyethyl (meth)acrylate with isophorone diisocyanate, reaction of 2-hydroxybutyl (meth)acrylate with 2,4-tolylene diisocyanate, reaction of 2-hydroxybutyl (meth)acrylate with isophorone diisocyanate, reaction of pentaerythritol tri(meth)acrylate with 2,4-toluene diisocyanate, reaction of pentaerythritol tri(meth)acrylate with isophorone diisocyanate, reaction of pentaerythritol tri(meth)acrylate with dicyclohexylmethane diisocyanate, reaction of dipentaerythritol penta(meth)acrylate with isophorone diisocyanate, or reaction of dipentaerythritol penta(meth)acrylate with dicyclohexylmethane diisocyanate.

The polyester (meth)acrylate may be prepared by reacting polyester polyol with acrylic acid according to a method known in the related art.

The polyester (meth)acrylate may include at least one selected from a group consisting of polyester acrylate, polyester diacrylate, polyester tetraacrylate, polyester hexaacrylate, polyester pentaerythritol triacrylate, polyester pentaerythritol tetraacrylate, and polyester pentaerythritol hexaacrylate, but it is not limited thereto.

The photo-polymerizable monomer and the photo-polymerizable oligomer may be used alone or in a mixture thereof. When the photo-polymerizable monomer and the photo-polymerizable oligomer are used in a mixture, workability and compatibility of the composition for forming a hard coating layer may be improved.

A content ratio of the photo-polymerizable monomer and the photo-polymerizable oligomer is not particularly limited, and may be appropriately selected in consideration of a storage modulus, contraction and workability of the hard coating layer. For example, they may be included in a content ratio of 10:1 to 1:10 of the photo-polymerizable oligomer to the photo-polymerizable monomer. If the content ratio of the photo-polymerizable oligomer to the photo-polymerizable monomer is beyond the above range, the storage modulus of the hard coating layer may be decreased or the contraction may be increased to reduce the hardness and flexibility, such that curling may occur.

A content of the photo-polymerizable compound is not particularly limited but may be included, for example, in an amount of 1 to 80 parts by weight ("wt. parts"), and preferably, 5 to 50 wt. parts to 100 wt. parts of the composition for forming a hard coating layer. If the content of the photo-polymerizable compound is less than 1 wt. part, an elastic modulus of the coating layer may be decreased, such that cracks may easily occur during bending. If the content thereof exceeds 80 wt. parts, a viscosity may be increased to lower applicability or coatability, and surface leveling may be insufficient to cause appearance defects.

Photo-Polymerization Initiator

The photo-polymerization initiator used for forming the hard coating layer of the present invention is not particularly limited so long as it may form a radical by light irradiation.

For example, the photo-polymerization initiator may include a type I photo-initiator which generates the radical by degradation of a molecule due to a difference in a chemical structure or molecular binding energy, and a type II photo-initiator which generates the radical by hydrogen recapture. The type I photo-initiator and the type II photo-initiator may be used alone or in a combination thereof.

Examples of the available type I photo-initiator may include acetophenones such as 4-phenoxy dichloro acetophenone, 4-t-butyl dichloro acetophenone, 4-t-butyl trichloro acetophenone, diethoxy acetophenone, 2-hydroxy-2-methyl-1-phenyl-1-one, 1-(4-isopropylphenyl)-2-hydroxy-2-methylpropane-1-one, 1-(4-dodecylphenyl)-2-hydroxy-2-methylpropane-1-one, 4-(2-hydroxyethoxy)-phenyl (2-hydroxy-2-propyl)ketone, 1-hydroxycyclohexyl phenylketone, etc.; benzoin such as benzoin, benzoin methylether, benzoin ethylether, benzyl dimethylketal, etc.; acylphosphine oxides; titanocene compounds, or the like. These compounds may be used alone or in a combination thereof.

Examples of the available type II photo-initiator may include benzophenones such as benzophenone, benzoylbenzoic acid, benzoylbenzoic acid methylether, 4-phenylbenzophenone, hydroxybenzophenone, 4-benzoyl-4'-methyldiphenyl sulfide, 3,3'-methyl-4-methoxybenzophenone, etc., or thioxanthones such as 2-chlorothioxanthone, 2-methylthioxanthone, 2,4-dimethylthioxanthone, isopropylthioxanthone, etc. These compounds may be used alone or in combination of two or more thereof.

A content of the photo-polymerization initiator is not particularly limited but may be included, for example, in an amount of 0.1 to 10 wt. parts, and preferably, 1 to 5 wt. parts to 100 wt. parts of the composition for forming a hard coating layer. If the content of the photo-polymerization initiator is less than 0.1 wt. parts, curing cannot be sufficiently performed, and thus sufficient mechanical properties or adhesion of the coating layer may not be achieved. If the content thereof exceeds 10 wt. parts, adhesion defects, cracks, curling, or the like due to curing shrinkage may occur.

Additive

The additive used for forming the hard coating layer of the present invention may be included for improving coating properties to the base film and decreasing a surface frictional coefficient. Among additives for improving surface coating properties generally and widely used, an additive having high slipping properties after curing may be used. Examples of the additive may include BYK-306, BYK-307, BYK-310, BYK-313, BYK-333, BYK-371, BYK-377, BYK-378, BYK-3440, BYK-UV3500, BYK-3550, BYK-UV3570, TEGO Glide 100, TEGO Glide 450, TEGO Glide B1484, TEGO Glide 420, TEGO Glide 482, TEGO Glide 410, TEGO Glide 415, or the like. These additives may be used alone or in a combination thereof.

A content of the additive is not particularly limited, but may be included in an amount of 0.01 to 1 wt. part to 100 wt. parts of the composition for forming a hard coating layer. If the content of the additive is less than 0.01 wt. parts, the additive cannot be sufficiently distributed on the surface of the substrate film, and the surface frictional coefficient may not be sufficiently decreased. If the content thereof exceeds wt. part, compatibility with other compositions may be degraded to cause precipitation or economic disadvantages.

The composition for forming a hard coating layer used for forming the hard coating layer according to the present invention may further include a leveling agent, UV stabilizer, thermal stabilizer, or the like other than the additive having high slipping properties.

The leveling agent may be included for providing smoothness and coating properties of the coating film.

The leveling agent may include a silicon leveling agent, fluorine leveling agent, acrylic polymer leveling agent, or the like. These agents may be used alone or in a combination thereof.

Examples of the commercially available leveling agent may include BYK-323, BYK-331, BYK-333, BYK-337, BYK-373, BYK-375, BYK-377 and BYK-378 manufactured by BYK Chemicals; TEGO Glide 410, TEGO Glide 411, TEGO Glide 415, TEGO Glide 420, TEGO Glide 432, TEGO Glide 435, TEGO Glide 440, TEGO Glide 450, TEGO Glide 455, TEGO Rad 2100, TEGO Rad 2200N, TEGO Rad 2250, TEGO Rad 2300 and TEGO Rad 2500 manufactured by TEGO Co.; FC-4430 and FC-4432 manufactured by 3M Co., or the like.

The leveling agent may be included, for example, in an amount of 0.1 to 1 wt. part to a total weight of the composition for forming a hard coating layer, but it is not limited thereto.

The UV stabilizer may be included for blocking or absorbing UV rays, so as to prevent the cured hard coating layer from degrading, discoloring and crumbling due to an exposure to the UV rays.

The UV stabilizer may include UV ray absorbents, quenchers, hindered amine light stabilizers (HALSs), etc., categorized by an acting mechanism, and phenyl salicylates (absorbents), benzophenone (absorbents), benzotriazole (quenchers), nickel derivatives (quenchers), radical scavengers, etc., categorized by a chemical structure. These compounds may be used alone or in a combination thereof.

The thermal stabilizer may include, for example, polyphenol primary thermal stabilizers, phosphite secondary thermal stabilizers, lactone thermal stabilizers, or the like. These stabilizers may be used alone or in a combination thereof.

<Shielding Pattern>

The shielding pattern 30 (e.g., a light-shielding pattern) may be a portion defining a non-display part which is not a display part for displaying an image, when the window film 100 is applied to the image display device. By the shielding pattern 30, the non-display part may serve as a region for concealing opaque conductive wiring patterns and various circuits, and a trade mark, or logo, etc., of a mobile phone maker may be printed thereon as necessary. In addition, various decorations or designs may be applied thereto for adding aesthetic property.

The shielding pattern 30 according to embodiments of the present invention is disposed between the first hard coating layer 20 and the second hard coating layer 40, and may be arranged at an outer area of the first and second hard coating layers 20 and 40. The shielding pattern 30 is disposed between the first hard coating layer 20 and the second hard coating layer 40, such that the shielding pattern 30 may not protrude from an outer surface of the window film. The window film (the shielding pattern embedded window film) according to embodiments of the present invention may have a flat or levelled outer surface while including the shielding pattern capable of forming the non-display part. Thus, when other members may be laminated, a stepped portion due to the shielding pattern 30 generated in the conventional window film may be removed or reduced.

In addition, since the shielding pattern 30 is disposed between the first and second hard coating layers 20 and 40, the shielding pattern 30 may be formed without considering interference with other optical films. For example, since the shielding pattern 30 may be disposed nearer to a visible side than a polarizing plate, it is possible to express more various and vivid colors in the shielding pattern 30. The shielding pattern 30 may be formed in a single layer or a plurality of layers. The second coating layer 40 directly contacts the first coating layer 20 and the shielding pattern 30 and is disposed toward a visible side of the window film 100.

The shielding pattern 30 may be formed in the stepped portion of the first hard coating layer 20, and preferably, the shielding pattern 30 may not protrude from a flat surface in which the stepped portion is not formed. For example, as illustrated in FIG. 2, an upper surface of the shielding pattern 30 may be substantially coplanar with an interface between the first hard coating layer 20 and the second hard coating layer 40, and may be substantially planar or flat.

Figure 3:
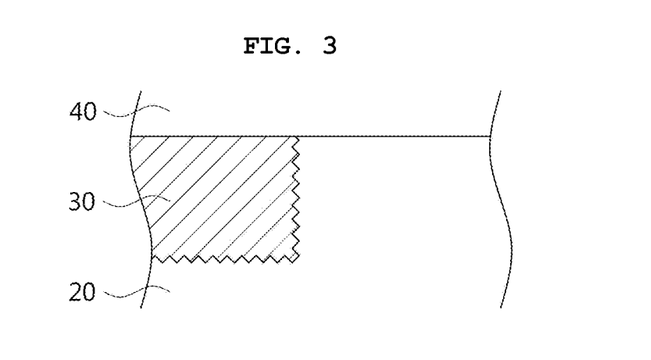
FIG. 3 is an enlarged cross-sectional view schematically illustrating a roughness difference depending on a position of a shielding pattern according to an embodiment of the present invention.

In one embodiment of the present invention, the shielding pattern 30 may have different roughnesses (Ra) between a surface contacting the first hard coating layer 20 and a surface contacting the second hard coating layer 40. For example, as illustrated in FIG. 3, the surface of the shielding pattern 30 contacting the first hard coating layer 20 may have a larger roughness than that of the surface contacting the second hard coating layer 40. In this case, when the second hard coating layer 40 is toward a visible side, the surface of the shielding pattern 30 having a low roughness is positioned toward the visible side, and the surface having a high roughness is positioned away from the visible side. Therefore, the user may view a relatively clean surface of the shielding pattern 30, so that visibility of various patterns and designs implemented in the shielding pattern 30 may be improved. Further, adhesion of the first hard coating layer 20 may be improved on the side opposite to the visible side by an anchoring effect due to a relatively higher roughness. In this case, the surface of the first hard coating layer 20 contacting the shielding pattern 30 may have the same roughness as that of the corresponding shielding pattern 30.

In this regard, provided that the surface of the shielding pattern 30 contacting the first hard coating layer 20 has a higher roughness, the surface of the shielding pattern 30 contacting the first hard coating layer 20 and the surface of the shielding pattern 30 contacting the second hard coating layer 40 may have each independently any value of about 0.001 to 150 μm. In addition, a difference in the roughness between the surface of the shielding pattern 30 contacting the first hard coating layer 20 and the surface contacting the second hard coating layer 40 may be in a range from about 0.01 to 100 μm.

When the shielding pattern 30 has the roughness or the difference in the roughness within the above-described range, visibility of the shielding pattern 30 and adhesion with the first hard coating layer 20 may be enhanced.

<Second Hard Coating Layer>

The second hard coating layer 40 may provide desired strength and hardness with the window film 100 similarly to the first hard coating layer 20, and may be provided for housing and protecting the shielding pattern 30.

As illustrated in FIG. 2, the second hard coating layer 40 may contact the first hard coating layer 20 and the shielding pattern 30 in a single surface, and preferably, the shielding pattern 30 may have a relatively lower roughness as described above to provide more improved visibility of the shielding pattern 30. In this regard, the second hard coating layer 40 side of the window film may be disposed toward the visible side.

The second hard coating layer 40 may be formed by using a material and a method substantially the same as those for the first hard coating layer 20.

In one embodiment of the shielding pattern embedded type window film of the present invention, a polarizer may be further laminated on a surface of the first hard coating layer 20.

The polarizer may include any polarizer used in the related art without particular limitation thereof, and for example, may be a film type polarizer, or a coating layer polarizer formed by directly applying a polymer solution containing a polymer resin and a dichroic material.

The film type polarizer may include any film type polarizer known in the related art without particular limitation thereof, and may be a polyvinylalcohol film having a dichroic dye adsorbed thereon.

The polymer resin for forming a polarizer coating layer may include, for example, a polyvinylalcohol resin. The polyvinylalcohol resin may be a polyvinylalcohol resin prepared by saponification of a polyvinyl acetate resin. The polyvinyl acetate resin may include polyvinyl acetate as a homopolymer of vinyl acetate, as well as a copolymer of vinyl acetate and any other copolymerizable monomer. The copolymerizable polymer may include, for example, unsaturated carboxylic acid monomers, unsaturated sulfonic acid monomers, olefin monomers, vinyl ether monomers, ammonium group-containing acrylamide monomers, or the like.

Also, the polyvinyl alcohol resin may include modified resin, for example, aldehyde-modified polyvinylformal or polyvinylacetal.

A polarizer layer may be formed by mixing a polyvinyl alcohol resin with a dichroic material and applying the mixed solution to prepare a film.

The polarizer according to embodiments of the present invention may be a polarizer of which at least one surface is adhered with a protective film. As the protective film, films having excellent properties such as transparency, mechanical strength, thermal stability, moisture-shielding properties, isotropic properties, or the like, may be used. For example, the protective film may include a film formed of a thermoplastic resin including, for example: a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acryl resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, etc.; a polyolefin having a cyclo- or norbornene structure, ethylene-propylene copolymer, etc.; a vinyl chloride resin; an amide resin such as nylon, an aromatic polyamide, etc.; an imide resin; a polyethersulfone resin; a sulfone resin; a polyether ether ketone resin; a polysulfide phenylene resin; a vinyl alcohol resin; a vinylidene chloride resin; a vinylbutyral resin, an allylate resin; a polyoxymethylene resin; an epoxy resin, and the like. Additionally, a film including a blend of the above thermoplastic resins may also be used. Alternatively, a film formed of a thermosetting resin such as (meth)acryl, urethane, acrylurethane, epoxy or silicon resins, etc. or UV-curable resins may be also used.

In one embodiment of the shielding pattern embedded type window film, a touch sensor may be further laminated on the surface on the first hard coating layer 20.

The touch sensor may include two types of electrode patterns for sensing an X coordinate and sensing a Y coordinate. In the shielding pattern embedded type window film according to embodiments of the present invention, at least one of a first sensing pattern and a second sensing pattern may be formed at a side of the first hard coating layer 20. Accordingly, since a separate substrate for forming the touch sensing electrode is not used, a thin film structure may be achieved.

The first and second sensing patterns are respectively disposed in different directions from each other to provide information on the X and Y coordinates of a touched position. For example, when a finger of a user or an object touches a transparent substrate, a change in capacitance depending on the touched position is detected and transferred to a driving circuit through the first and second sensing patterns, and a position detecting line. Then, the change in capacitance may be converted to an electrical signal by X and Y input processing circuits to identify the touched position.

In this regard, the first and second sensing patterns may be formed on a side of a base layer, and may be electrically connected with each other to detect the touched position. However, since it is necessary for the first sensing pattern and the second sensing patter to maintain electrical insulation from each other, any one of the first sensing patterns and the second sensing patterns may be connected with each other while the other may be separated from each other in an island shape, thereby additional connection electrodes (bridge electrodes) may be necessary to electrically connect the separated patterns.

For example, when the first sensing patterns are formed in a separated structure, e.g., the island shape, and the second sensing patterns are formed to be connected with each other, the bridge electrodes may be electrically connected to the first sensing patterns, while being insulated from the second sensing patterns. Therefore, the bridge electrodes may be formed in a different level from the second sensing patterns. Generally, the first sensing pattern and the second sensing pattern may be electrically insulated from each other through an insulation layer. To connect the first sensing patterns separated from each other in the island shape by the bridge electrodes while electrically isolated from the second sensing patterns, contact holes may be formed in the insulation layer. After forming the contact holes, the bridge electrode may be formed.

Any conventional material used in the related art may be used to form the first and second sensing patterns without particular limitation thereof. From an aspect of preventing degrade of a visibility of an image displayed on a screen, a transparent material may be used to form fine patterns. Examples of the material for forming the sensing patterns may include indium-tin oxide (ITO), indium-zinc oxide (IZO), zinc oxide (ZnO), indium-zinc-tin oxide (IZTO), cadmium-tin oxide (CTO), poly(3,4-ethylenedioxythiopene) (PEDOT), carbon nanotube (CNT), a metal wire, a metal mesh, etc. These may be used alone or in a combination thereof.

Metals used in the metal wire or metal mesh are not particularly limited but may include, for example, silver (Ag), gold, aluminum, copper, iron, nickel, titanium, tellurium, chromium, etc., which are used alone or in a combination thereof.

According to another embodiment of the shielding pattern embedded type window film of the present invention, the polarizer and the touch sensor may be further laminated on a side of the first hard coating layer 20. A lamination sequence of the polarizer and the touch sensor is not particularly limited, and for example, the polarizer and the touch sensor may be sequentially laminated on the side of the first hard coating layer 20, or may be laminated in the reverse order. The above descriptions may be equally applied to the polarizer and the touch sensor, and the polarizer may have the protective film adhered to the at least one surface thereof.

The window film having the above-described configuration may be combined with other structures and/or elements known in the related art to be used in a fabrication of the image display device.

The image display device according to embodiments of the present invention is not particularly limited, and may include various image display devices such as a conventional liquid crystal display (LCD) device, an organic light emitting diode (OLED) display device, an electroluminescent display device, a plasma display panel, a field emission display device, or the like. In particular, when the base film is a polymer film, the window film may be applied to a flexible display device, and in a case of being combined with the touch sensor, the window film may be applied to the touch screen.

Further, the present invention provides a method of preparing the above-described shielding pattern embedded type window film.

Figure 4:
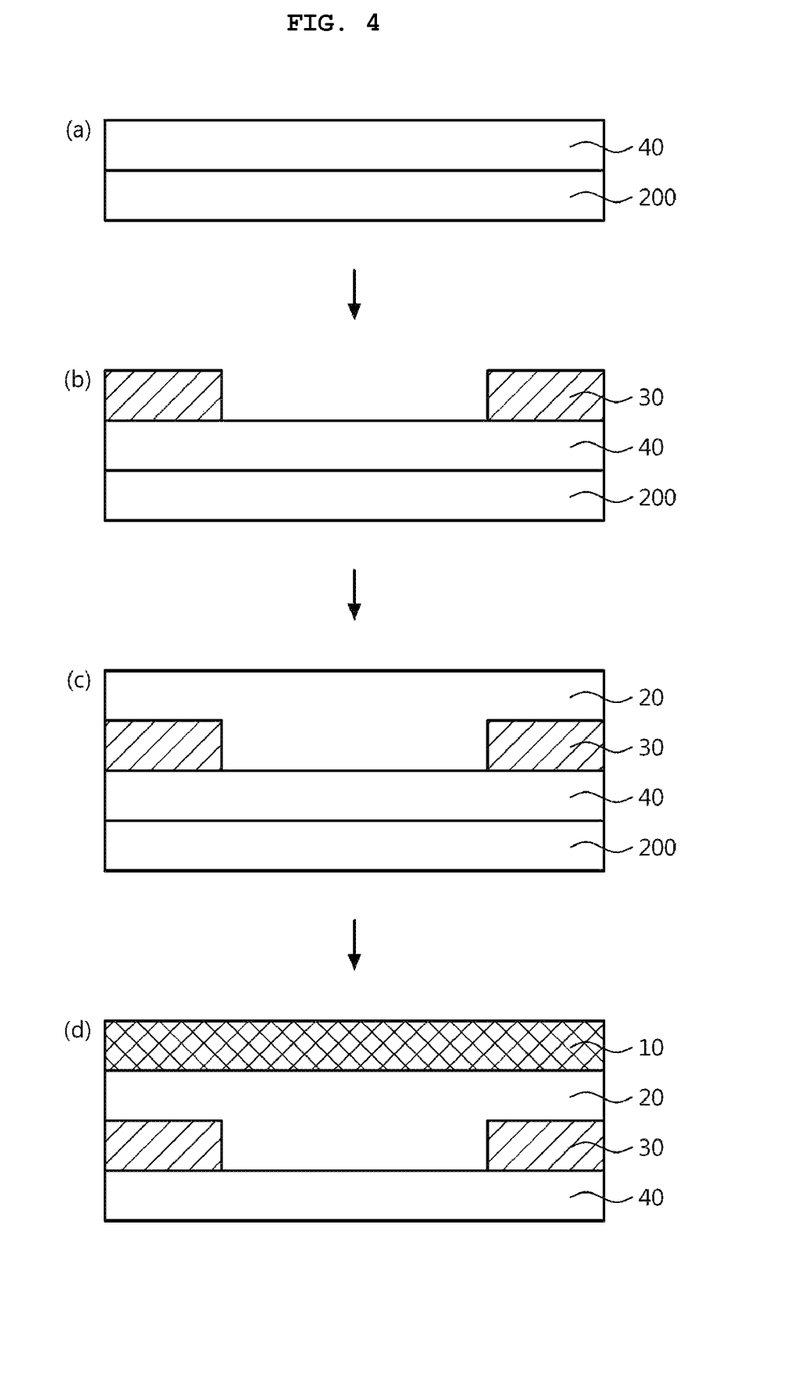
FIG. 4 is cross-sectional views schematically illustrating a method of preparing a window film according to an embodiment the present invention.

Hereinafter, the method of preparing a shielding pattern embedded type window film according to embodiments of the present invention will be described in more detail. FIG. 4 includes cross-sectional views schematically illustrating the method of preparing a window film according to an embodiment the present invention.

First, the second hard coating layer 40 may be formed on a carrier substrate 200 (FIG. 4a).

The hard coating layer may be foiled by applying the composition for forming a hard coating layer on the carrier substrate and curing the same, and may be formed by any method known in the related art such as slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, or the like.

After applying the composition for forming the hard coating layer, the second hard coating layer 40 may be formed through a curing process and a drying process.

Next, a shielding pattern 30 may be formed at an outer area of the second hard coating layer 40 (FIG. 4b).

The shielding pattern 30 may be formed by applying a composition for forming a shielding pattern on the second hard coating layer 40. Application of the composition for forming the shielding pattern may be performed by the same method used in the hard coating layer.

In one embodiment of the present invention, if necessary, processes for generating a roughness may be performed on a surface exposed when forming the shielding pattern 30. A method of generating the roughness may include any method known in the related art without particular limitation thereof, and may include, for example, a physical method of applying a force to the shielding pattern by using a mold, a chemical method of employing a solvent used in the composition for forming the shielding pattern according to volatility and adjusting the volatility of the solvent, or conducting a heat treatment after applying the composition to adjust a degree of evaporation, or the like.

When performing the process for generating the roughness, the surface of the shielding pattern 30 that may contact the second hard coating layer 40 may not be subjected to the process, thus to have a relatively lower roughness. The surface of the shielding pattern 30 that may not contact the second hard coating layer 40 may be subjected to the process, thus to have a relatively higher roughness.

Next, the first hard coating layer 20 may be formed on the second hard coating layer 40 on which the shielding pattern 30 is formed (FIG. 4c).

The first hard coating layer 20 may be formed by using the composition substantially the same as that for forming the second hard coating layer 40. In this case, the composition for forming a hard coating layer may be applied so as to cover both of the second hard coating layer 40 and the shielding pattern 30, such that the surface thereof may be substantially planarized. Therefore, the first hard coating layer 20 may include a stepped portion due to the shielding pattern 30 protruding from the second hard coating layer 40.

In addition, when the shielding pattern 30 is subjected to the process for generating the roughness, the cured composition for forming a hard coating layer may have the roughness corresponding to the surface of the shielding pattern 30.

Curing and drying after applying the composition may be performed in a method substantially the same as or similar manner to that of the second hard coating layer 40.

Thereafter, the base film 10 may be adhered to the first hard coating layer 20, and the carrier substrate 200 may be peeled-off from the second hard coating layer 40 (FIG. 4d).

The base film 10 may be adhered to the first hard coating layer 20 using an adhesion means such as a bonding layer or an adhesive layer. After completing the adhesion of the base film 10, the carrier substrate 200 may be peeled-off to obtain the shielding pattern embedded type window film.

What is claimed is:

1. A shielding pattern embedded type window film, comprising:
    a base film;
    a first coating layer and a second coating layer which are sequentially laminated on one surface of the base film; and
    a shielding pattern disposed at an outer area between the first coating layer and the second coating layer,
    wherein the second coating layer directly contacts the first coating layer and the shielding pattern and is disposed toward a visible side of the window film; and
    a surface of the shielding pattern contacting the first coating layer has a larger roughness than that of a surface contacting the second coating layer.

2. The shielding pattern embedded type window film according to claim 1, further comprising an adhesive layer or a bonding layer formed between the base film and the first coating layer.

3. The shielding pattern embedded type window film according to claim 1, wherein the first coating layer includes a stepped portion at the outer area, and the shielding pattern is formed in the stepped portion while not protruding from a flat surface of the first coating layer in which the stepped portion is not formed.

4. The shielding pattern embedded type window film according to claim 1, wherein a difference in the roughness between the surface of the shielding pattern contacting the first coating layer and the surface contacting the second coating layer is in a range of 0.01 to 100 μm.

5. The shielding pattern embedded type window film according to claim 1, wherein the second coating layer contacts the first coating layer and the shielding pattern in a single surface.

6. The shielding pattern embedded type window film according to claim 1, further comprising a polarizer laminated on a side of the first coating layer.

7. The shielding pattern embedded type window film according to claim 6, wherein the polarizer has a protective film adhered on at least one surface thereof.

8. The shielding pattern embedded type window film according to claim 1, further comprising a touch sensor laminated on a side of the first coating layer.

9. The shielding pattern embedded type window film according to claim 1, further comprising a polarizer and a touch sensor laminated on a side of the first coating layer.

10. An image display device comprising the shielding pattern embedded type window film according to claim 1.

* * * * *